US007540510B2

(12) United States Patent
Sparkowski

(10) Patent No.: US 7,540,510 B2
(45) Date of Patent: Jun. 2, 2009

(54) MOVABLE RACK

(75) Inventor: Robert P. Sparkowski, Schaumburg, IL (US)

(73) Assignee: Chicago Display Marketing Corporation, River Grove, IL (US)

( * ) Notice: Subject to any disclaimer, the term of this patent is extended or adjusted under 35 U.S.C. 154(b) by 481 days.

(21) Appl. No.: 11/482,461

(22) Filed: Jul. 7, 2006

(65) Prior Publication Data
US 2008/0007019 A1 Jan. 10, 2008

(51) Int. Cl.
B62B 1/00 (2006.01)
B62B 3/00 (2006.01)
B62B 3/02 (2006.01)
B62D 21/14 (2006.01)

(52) U.S. Cl. ............... 280/79.3; 280/47.34; 280/47.35; 280/638; 280/35; 280/646; 211/153; 248/128; 108/16; 108/106; 108/107; 108/108; 108/110

(58) Field of Classification Search ............... 280/79.3, 280/79.11, 79.7, 47.34, 47.35, 638, 35, 646; 211/85.4, 22, 71.01, 186, 187, 153, 192, 211/193, 190; 248/128; 108/16, 106, 107, 108/108, 110
See application file for complete search history.

(56) References Cited

U.S. PATENT DOCUMENTS

| | | | |
|---|---|---|---|
| 725,851 A | 4/1903 | Kopp | |
| 1,971,744 A | 8/1934 | Brykczyski et al. | |
| 3,403,789 A | 10/1968 | Morte et al. | |
| 3,891,228 A | 6/1975 | Rhinehart et al. | |
| 3,953,044 A | 4/1976 | Wilson | |
| 4,004,819 A | 1/1977 | Brongo | |
| 4,020,771 A | 5/1977 | Hasenour | |
| 4,045,043 A | 8/1977 | Fourrey | |
| 4,297,952 A | 11/1981 | Zagaroli | |
| 4,302,025 A | 11/1981 | Waddell et al. | |
| 4,397,606 A | 8/1983 | Bruton | |
| 4,428,304 A | 1/1984 | Moser | |
| 4,606,280 A | 8/1986 | Poulton et al. | |
| 4,627,542 A | 12/1986 | Fredrickson | |
| 4,932,333 A | 6/1990 | Jensen et al. | |
| 4,986,555 A * | 1/1991 | Andreen | 280/47.35 |
| 4,999,862 A | 3/1991 | Hefty | |
| 5,029,895 A | 7/1991 | Anderson | |
| 5,076,448 A * | 12/1991 | Ballard | 212/294 |
| 5,628,257 A | 5/1997 | Conner et al. | |
| 5,718,441 A | 2/1998 | Kern et al. | |
| 6,076,621 A * | 6/2000 | Horn | 180/19.2 |
| 6,203,029 B1 | 3/2001 | Ondrasik | |
| D478,739 S | 8/2003 | Sparkowski | |

(Continued)

Primary Examiner—Christopher P Ellis
Assistant Examiner—John R Olszewski
(74) Attorney, Agent, or Firm—Michael Best & Friedrich LLP

(57) ABSTRACT

A movable rack for supporting articles. In a preferred embodiment, the rack comprises a frame which supports first and second shelf groups. The second shelf group can be added to the rack when additional shelf space is required and can be removed when additional shelf space is not needed or when the rack is to be moved through or stored in places with limited floor space. Wheel supports and wheels are secured with respect to the frame permitting the rack to be moved. The wheel supports are extensible outward from the frame thereby improving rack stability, particularly when one or more of the second group shelves are attached or when it is desired to move the rack.

20 Claims, 6 Drawing Sheets

U.S. PATENT DOCUMENTS

| | | |
|---|---|---|
| 6,669,213 B2 | 12/2003 | Woerner |
| 6,729,484 B2 | 5/2004 | Sparkowski |
| 6,749,208 B2 | 6/2004 | Orozco et al. |
| 6,773,081 B2 | 8/2004 | Yuyama et al. |
| D497,738 S | 11/2004 | Sparkowski |
| 6,811,163 B1 | 11/2004 | Guruleet et al. |
| 6,811,164 B2 | 11/2004 | Trogstam |
| 6,874,430 B1 | 4/2005 | McCandless |
| 6,883,881 B2 | 4/2005 | Gauss |
| 6,918,498 B2 | 7/2005 | Sparkowski |
| 6,935,523 B2 | 8/2005 | Ahn |
| 2004/0211741 A1* | 10/2004 | Bustos et al. ............... 211/187 |
| 2005/0230338 A1* | 10/2005 | Farinola et al. ............. 211/186 |
| 2006/0032829 A1* | 2/2006 | Hutzler ....................... 211/187 |

* cited by examiner

MOVABLE RACK

FIELD

The field relates to racks and, more specifically, to movable racks having shelves.

BACKGROUND

Movable racks are frequently used to support one or more articles and to transport the articles from place to place. Movable racks typically have one or more shelves provided to support the articles and have one or more wheels provided to permit rack movement. The movable racks may be pushed or pulled manually by one or more persons or by use of a machine, such as a fork lift.

A problem with known movable racks is that these types of racks have a finite, or limited, amount of shelf space. Additional racks must be provided if the article quantity or size exceeds the rack's shelf space. Obviously, any requirement for additional racks imposes costs on the rack user.

Alternatively, a rack user could utilize a larger rack with more shelf space, either in the form of a greater number of shelves or longer, wider or deeper shelves. However, the use of a larger rack with more shelf space may cause the rack to be top heavy and unstable, particularly when the rack is loaded with articles and is being moved. And, a larger rack typically has a bigger footprint which may make the rack impractical for use in buildings and places with narrow corridors, limited floor space or limited rack storage space.

It would represent a significant improvement in the art to provide a movable rack which would have shelf space sufficient to meet the rack user's requirements, which would be stable when loaded and during rack movement and which would have a footprint making the rack capable of use consistent with the rack user's available floor space or storage space.

BRIEF DESCRIPTION OF THE DRAWINGS

The invention may be understood by reference to the following description taken in conjunction with the accompanying drawings, in which like reference numerals identify like elements throughout the different views. The drawings are not necessarily to scale, emphasis instead being placed upon illustrating the principles of the invention.

DETAILED DESCRIPTION

Figure 1:
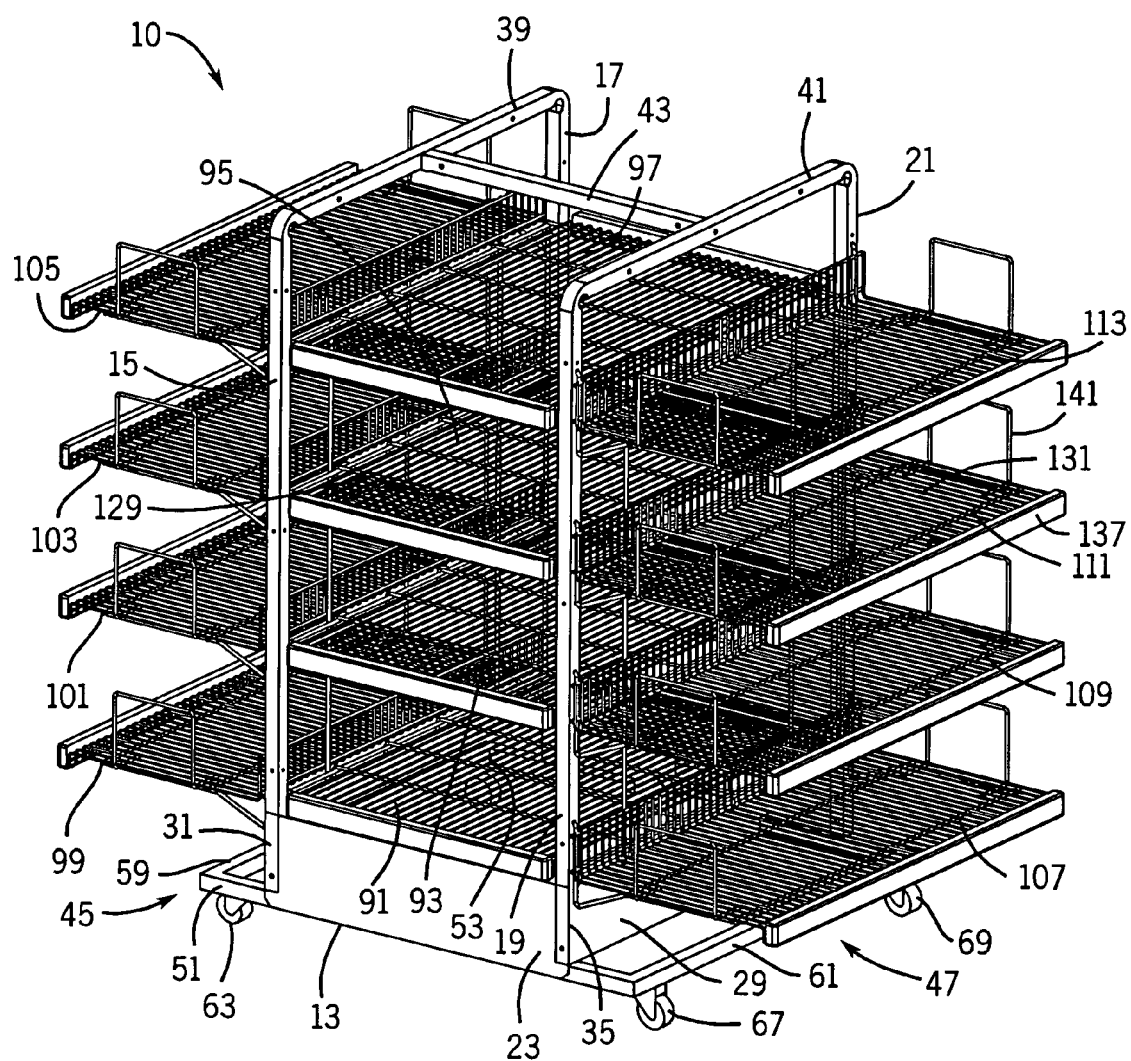
FIG. 1 is a perspective view of an exemplary rack including wheel supports in an extended position and auxiliary shelves.

Referring first to FIGS. 1-6; those figures show a preferred embodiment of a movable rack 10. Rack 10 is of a type used to support articles placed thereon. For example, exemplary rack 10 could be used to support loaves of bread or other bakery articles. It is to be understood, however, that rack 10 may be used with any type of article or articles and in any application wherein it is desired to support articles on a rack.

Rack 10 is provided with a frame 11. In the embodiment, frame 11 includes a base 13 and uprights 15, 17, 19, 21. Preferred uprights 15-21 extend vertically upward from base 13 as shown in FIGS. 1-6. Frame 11 may have configurations other than as shown in FIGS. 1-6.

Referring further to the example of FIGS. 1-6, base 13 is preferably fabricated from a pair of front and rear side members 23, 25 and a pair of left and right side members 27, 29. (It is to be understood that the designation of any rack 10 part as front, rear, left or right is made for convenience only.) Front and rear side members 23, 25 are preferably joined at generally right angles to left and right side members 27, 29 forming four corners 31, 33, 35, 37 and providing base 15 with a generally rectangular configuration. Side members 23-29 may comprise extrusions. Aluminum is a preferred material for use in manufacture of side members 23-29. Side members 23-29 are preferably joined together by welding or by use of mechanical fasteners, such as nuts and bolts.

Persons of skill in the art will readily appreciate that base 13 may be fabricated in forms other than the preferred multi-part rectangular-type base described above. By way of example only, base 13 may comprise a single piece of material (not shown) in place of plural side members 23-29 or may be made of tubular members. By way of further example, base 13 may have geometric configurations other than the rectangular configuration shown including, for example, configurations in the form of a pentagon or oval. Many types of materials may be used to manufacture base 13. For example, carbon steel plate may be used in fabrication of base 13.

Referring again to the example of FIGS. 1-6, uprights 15-21 are preferably disposed proximate a respective corner 31-37 of base 13 thereby widening and stabilizing frame 11. Uprights 15-21 may be secured to base 13 by welding uprights to base 13 at a respective corner 31-37. Uprights 15-21 may be secured to base 13 in other suitable manners, such as by seating uprights 15-21 in a corresponding receiver (not shown) at each corner 31-37 or by mechanical fasteners (not shown) such as nuts and bolts.

Cross members 39, 41, 43 may be provided to strengthen and add rigidity to frame 11. Cross member 39 spans uprights 15, 17 and cross member 41 spans uprights 19, 21. Cross member 43 spans between cross members 39, 41 preferably at right angles to cross members 39, 41. Uprights 15, 17 and cross member 39 and uprights 19, 21 and cross member 41 may each be fabricated from a single tube bent into the shape as illustrated in FIGS. 1-6. Uprights 15-21 and cross members 39, 41 may be made of extruded aluminum tubing or any other material providing the desired strength and rigidity. Carbon steel is such an alternative material. It will also be appreciated that uprights 15-21 and cross members 39-43 may be separate parts joined together by welding, by friction fit, and/or by mechanical fasteners, such as nuts and bolts.

Figure 7:
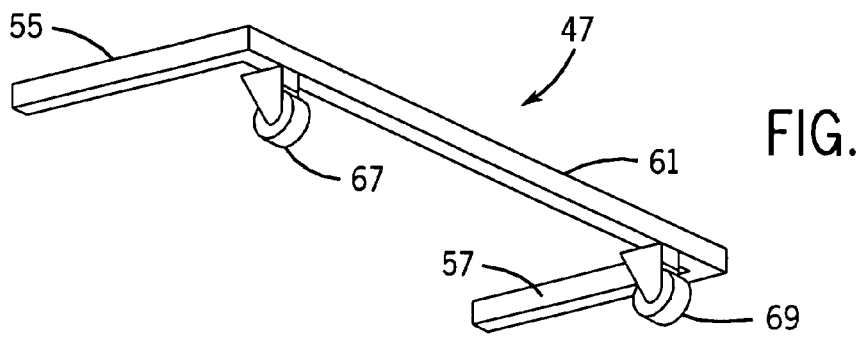
FIG. 7 is a perspective view of an exemplary wheel support of the rack of FIGS. 1 and 4 shown apart from the rack.
Figure 7A:
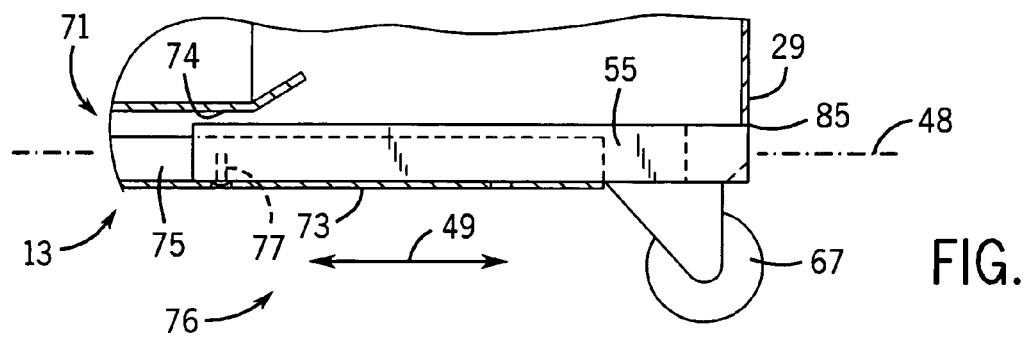
FIGS. 7a-7c are enlarged partial side elevation views of the exemplary wheel support of FIG. 7 mounted on the rack and showing exemplary structure enabling the wheel supports to be moved between a retracted position (FIG. 7a) and an extended position (FIG. 7c). Certain portions are shown in phantom line to facilitate understanding of the wheel support.
Figure 7B:
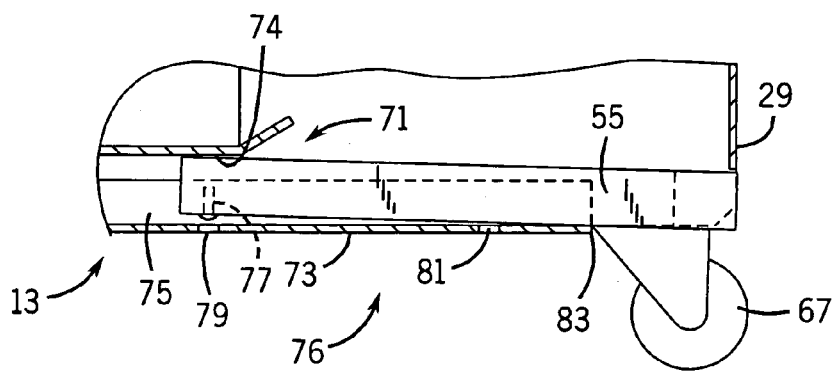
Figure 7C:
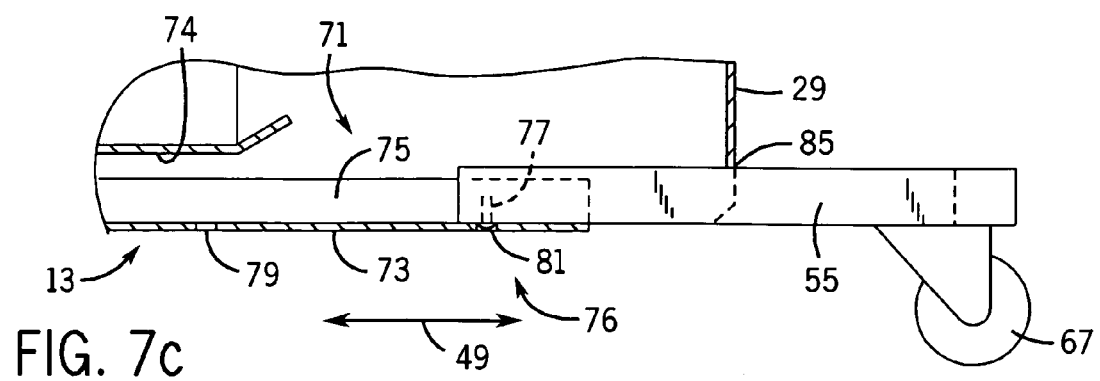

Referring now to FIGS. 1-7c, those figures illustrate an embodiment of extensible left and right wheel supports 45, 47. Extensible wheel supports 45, 47 enable the user to either widen the rack 10 footprint for stability during rack movement or when loaded with articles and further enables the user to narrow the rack footprint to facilitate rack maneuverability in confined spaces or to make the rack more compact for storage. Widening, or narrowing, of the rack 10 footprint is accomplished in this example by movement of wheel supports 45, 47 outwardly or inwardly in one of the directions of dual-headed arrow 49 (FIGS. 7a, 7c). FIGS. 1-3 and 7c show wheel supports 45, 47 in an "extended" position in which wheel supports 45, 47 are extended outwardly from base 15 thereby expanding the rack 10 footprint. Alternatively, FIGS. 4-6 and 7a show wheel supports 45, 47 in a "retracted" position moved inwardly toward base 13 to a position in which the rack 10 footprint is narrowed or minimized.

The preferred extensible wheel supports 45, 47 shown in the embodiment of FIGS. 1-7c are parts that operate by sliding. Persons of skill in the art will appreciate that sliding parts of various types may be utilized consistent with the principles of the rack 10 invention.

In the example, preferred wheel supports 45, 47 each comprise wheel support members 51, 53, 55, 57, cross members 59, 61 and wheels 63, 65, 67, 69. Caster wheels are preferred for use as wheels 63-69 because caster wheels pivot 360 degrees and permit ease of movement of rack 10. Wheel support members 51-57 and cross members 59, 61 of wheel supports 45, 47 may be made of extruded aluminum tubing, carbon steel or any other material providing the desired strength and rigidity.

In the embodiment, each wheel support member 51-57 travels, or slides, axially and bi-directionally along an axis in the directions of dual-headed arrows 49 within a fixed-position guide apparatus secured to base 13. As illustrated in FIG. 7a, wheel support member 55 (and wheel support member 51) each travel along axis 48 while wheel support members 53 and 57 each travel along a separate axis (not shown) proximate rack rear side member 25 spaced apart from and parallel to axis 48.

Each wheel support member 51, 53, 55 and 57 travels in a guide, one of which 71, is illustrated in FIGS. 7a, 7b and 7c in connection with wheel support member 55. The guide apparatus for each of wheel support members 51, 53, 57 is a mirror image of guide apparatus 71, but is otherwise identical to guide apparatus 71. For convenience, guide apparatus 71 will be described with the understanding that the description of guide apparatus 71 is applicable to the guides provided for each of wheel support members 51, 53 and 57.

Referring then to FIGS. 7a-7c, guide apparatus 71 for wheel support member 55 comprises an elongate channel formed by front side member 23, base 13 bottom wall 73 and guide wall 75 spaced apart from front side member 23 and extending upwardly within base 13 from bottom wall 73. Guide wall 75 is spaced apart from front wall side member 23 sufficiently to limit lateral movement of wheel support member 55 with respect to base 13 yet permit wheel support member 55 to travel easily within guide apparatus 71. A lubricant, such as lithium grease, may be provided to facilitate sliding movement of wheel support members 51-57 within the respective guide.

A stop wall 74 is supported within base 13 and is provided to limit upward movement of wheel support member 55 as shown in FIG. 7b. A stop mechanism 76 comprising pin 77 and openings 79, 81 in bottom wall 73 is provided to limit movement of wheel support member 55. Pin 77 is designed to extend into openings 79 and 81 in base bottom wall 73 as described in detail below.

The preferred wheel supports 45, 47 are moved back-and-forth between the retracted (FIG. 7a) and extended (FIG. 7c) positions in the following manner. Again, the description is made in connection with wheel support 47 and wheel support member 55. In the retracted position of FIG. 7a, pin 77 is seated in opening 79 preventing inward and outward movement of wheel support member 55 and wheel support 47. Load from rack 10 is transferred down through frame 11 side 29 and corner 35 onto caster wheel 67. Rack 10 may be moved easily with wheel supports 45, 47 in the retracted position.

Wheel supports 45, 47 are easily moved to the extended position in the following manner. When preparing to extend wheel support 47, the user first lifts the rack right side unloading wheel support 47 and causing wheel support member 55 to pivot about fulcrum 83 such that the outboard end of wheel support member 55 drops down and the inboard end of wheel support member 55 moves up lifting pin 77 out of opening 79 as shown in FIG. 7b. Stop wall 74 limits upward movement of the wheel support member 55 inboard end, keeping wheel support member 55 in the channel of guide apparatus 71 between side 23 and wall 75. Next, the user next slides wheel support 47 outwardly, for example by pulling against cross member 61 with the user's foot.

Sliding outward movement of wheel support member 55 is stopped when pin 77 aligns with opening 81 and drops down into opening 81. Wall 29 acts as a second fulcrum 85 and the load applied to wheel support member 55 moves the inboard end of wheel support member 55 down seating pin 77 firmly in opening 81 preventing further outward movement of wheel support member 55. Opening 81 is positioned such that wheel support 47 moves outwardly sufficient to stabilize rack 10 but not so far as to permit wheel support 47 to become unstable.

Left side wheel support 45 is extended in the manner described above in connection with wheel support 47 simply by sliding wheel support members 51, 53 outwardly in their corresponding guides. Rack 10 may now be moved easily with wheel supports 45, 47 in the extended position. The foregoing process is simply reversed to easily move wheel supports 45, 47 inwardly to the retracted position.

Wheel supports 45, 47 may be supported for movement in manners other than as described above. For example, each guide apparatus for wheel support members 51-57 could comprise a hollow tube within which wheel support members 51-57 slide axially in a telescoping-type relationship. By way of further example, bearings and other friction-reducing devices may be utilized to facilitate axial sliding movement of wheel support members 51-57 within the respective guide apparatus (e.g., guide apparatus 71). Stop mechanism 76 may comprise spring loaded detents and other stop mechanisms known to persons of skill rather than the stop mechanism comprising pin 77 and openings 79, 81.

Preferred shelves for use with rack 10 will now be described in connection with FIGS. 1-6 and 8-10. Rack 10 is provided with first and second shelf groups 87, 89 for supporting articles. In the example, the first shelf group 87 comprises four centrally-located shelves 91, 93, 95, 97 supported by frame 11 and the second shelf group 89 comprises eight auxiliary shelves 99, 101, 103, 105, 107, 109, 111, 113 extending outwardly from rack 10 frame 11. First and second shelf groups 87, 89 may include any number of shelves as desired by the user and permitted by the size of rack 10.

Shelves 99-113 are "auxiliary" shelves in the sense that such shelves 99-113 provide storage space which supplements that of shelves 91-97. Shelves 99-113 are designed to be rapidly attached to, and removed from, frame 11. This capability enables the user to quickly increase rack 10 storage capacity or, alternatively, to rapidly decrease the rack 10 footprint facilitating rack 10 storage or rack 10 movement.

Figure 8:
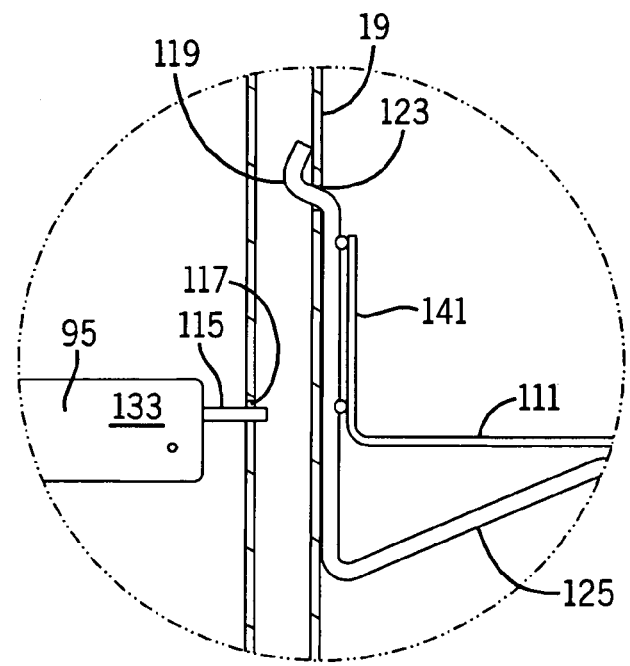
FIG. 8 is an enlarged section view taken along section 8-8 of FIG. 2.
Figure 9:
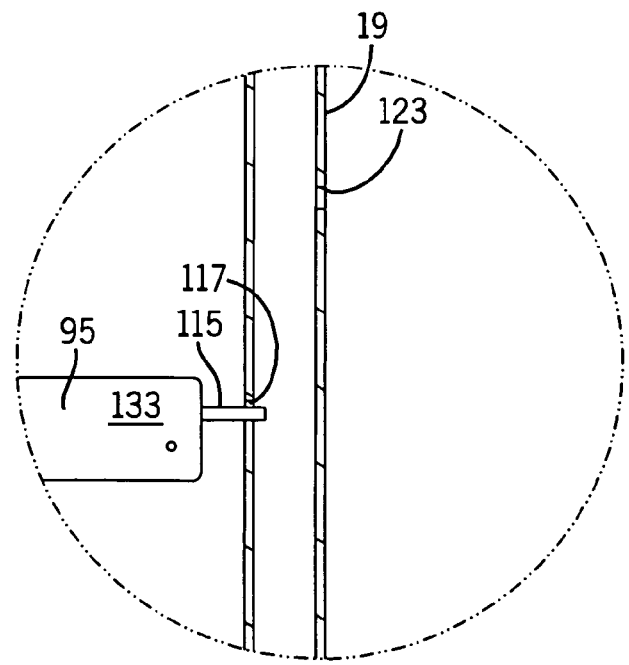
FIG. 9 is an enlarged section view taken along section 9-9 of FIG. 5.

In the embodiment, shelves 91-97 comprising first shelf group 87 span between uprights 15-21 and are supported by uprights 15-21 by means of a pin, such as pin 115 (FIGS. 2, 5, 8-9) located at the corner of each shelf 91-97. Each shelf 91-97 pin (e.g., pin 115) is located in a corresponding opening in a respective upright 15-21, one of which is opening 117 (FIGS. 8-9). Additional openings (not shown) may be provided in uprights 15-21 permitting each shelf 91-97 to be moved up and down frame 11 as desired. Decoupling of each pin from the respective opening permits removal of shelves 91-97 for cleaning or service. Shelves 91-97 may be secured to uprights 15-21 by other means such as by welding, friction fit, brackets, mechanical fasteners and the like.

Figure 10:
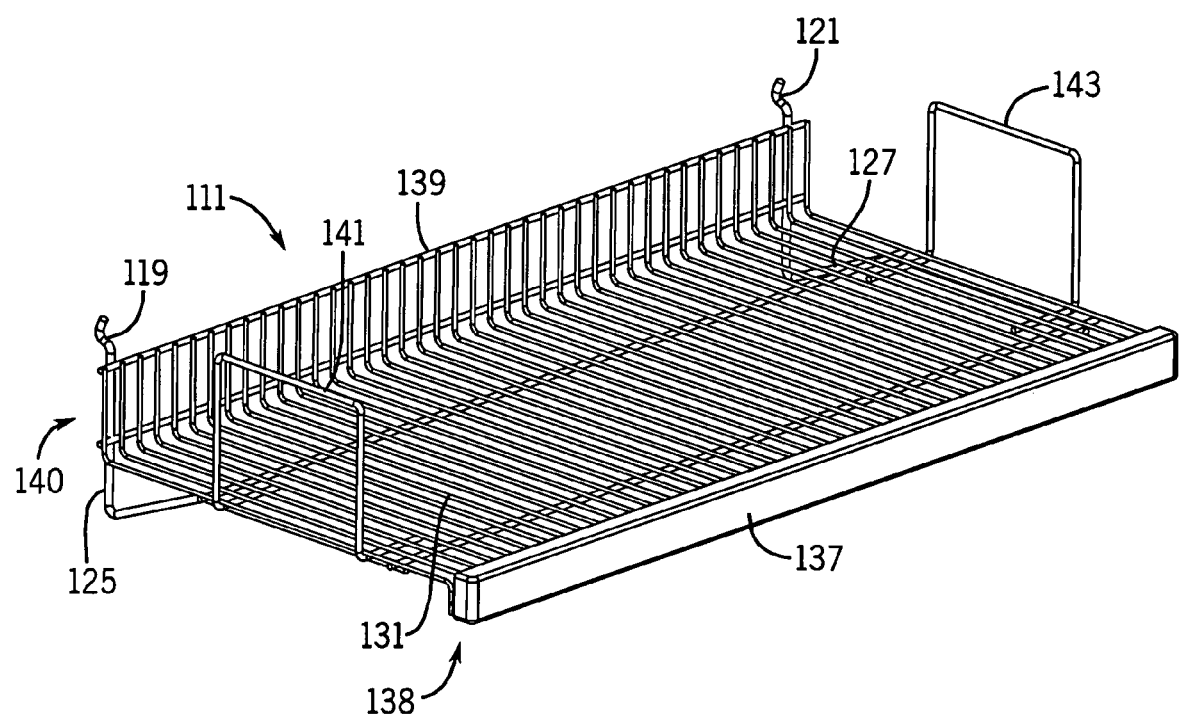
FIG. 10 is a perspective view of an exemplary auxiliary shelf.

In the example, shelves 99-113 comprising second shelf group 89 extend outwardly from right side uprights 15, 17 or left side uprights 19, 21. FIGS. 8-10 illustrate preferred structure for mounting a representative auxiliary shelf 111 to uprights 19, 21. Each other auxiliary shelf 99-109 and 113 may have a structure identical to shelf 111 and may be mounted to the respective upright 15-21 in the same manner.

Turning then to FIGS. 8-10, representative auxiliary shelf 111 is supported by uprights 19, 21 by means of connectors, preferably in the form of hooks 119, 121 located along shelf inner end 140. Each hook 119, 121 is inserted into a corresponding opening in a respective upright 19, 21 such as opening 123 shown in FIGS. 8-9. Braces 125, 127 rest against the respective upright 19, 21 supporting shelf 111 in the cantilevered position of FIGS. 1-3 and 8. Additional openings (not shown) may be provided in uprights 15-21 permitting each auxiliary shelf 99-113 to be moved up and down frame 11 as desired. Decoupling of the hooks 119, 121 from the openings permits easy removal of shelf 111 (and auxiliary shelves 99-109, 113) for storage, cleaning or service. Shelves 99-113 may be secured to uprights 15-21 by connectors other than hooks 119, 121 provided that such connectors permit rapid attachment and detachment of shelves 99-113 from frame 11.

Referring to FIGS. 1-3 and 8-9, each auxiliary shelf 99-113 is most preferably located adjacent one of shelves 91-97 and extends outwardly from one of such shelves 91-97. It is also preferred that each shelf 91-97 has a generally planar surface 129 and that each auxiliary shelf 99-113 has a generally planar surface 131. Optionally, adjacent first 91-97 and second 99-113 shelves may be configured such that the surfaces 129, 131 of adjacent shelves are co-planar or approximately co-planar as shown.

Figure 2:
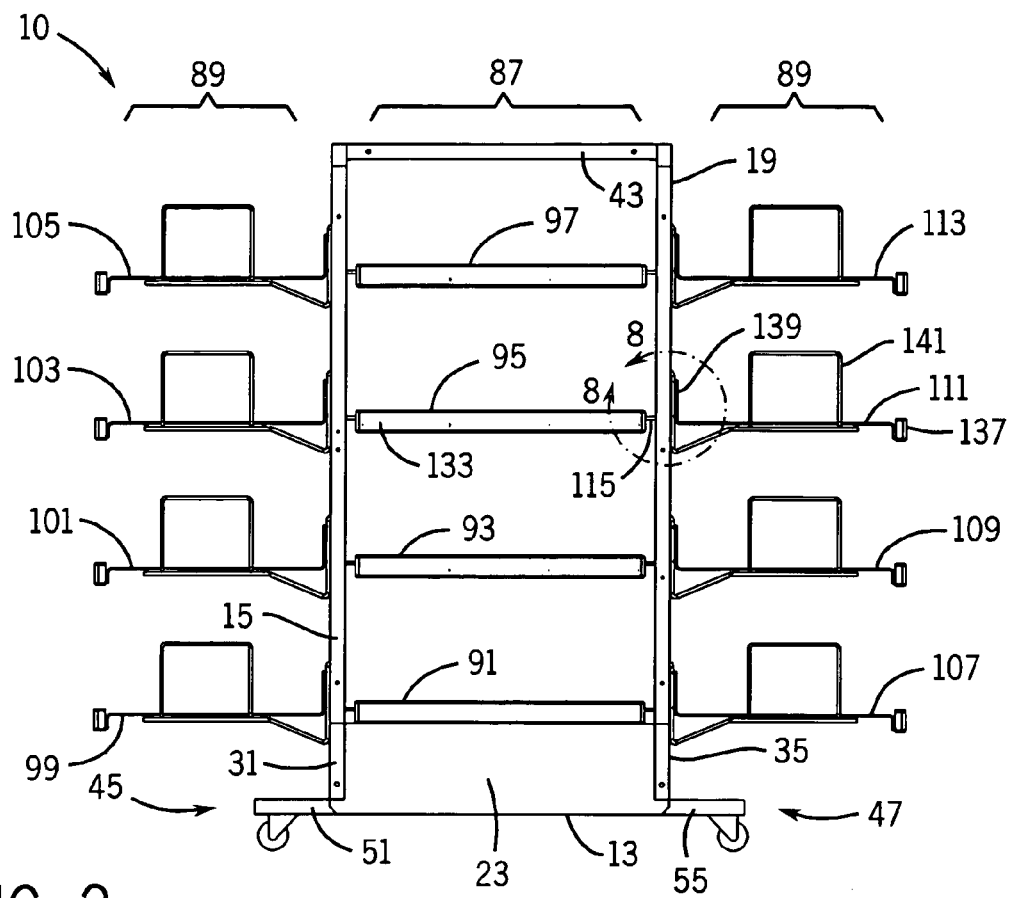
FIG. 2 is a front elevation view of the rack of FIG. 1.
Figure 3:
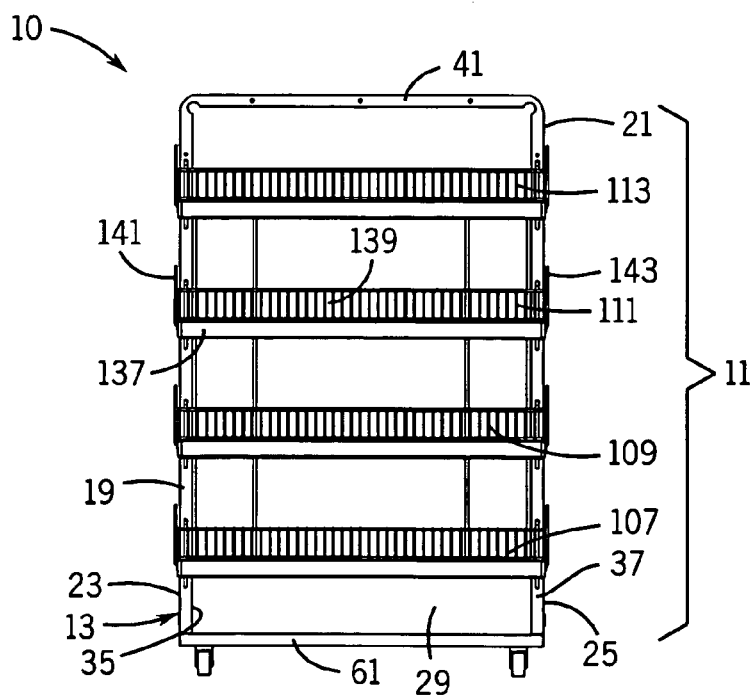
FIG. 3 is a right side elevation view of the rack of FIGS. 1-2.
Figure 4:
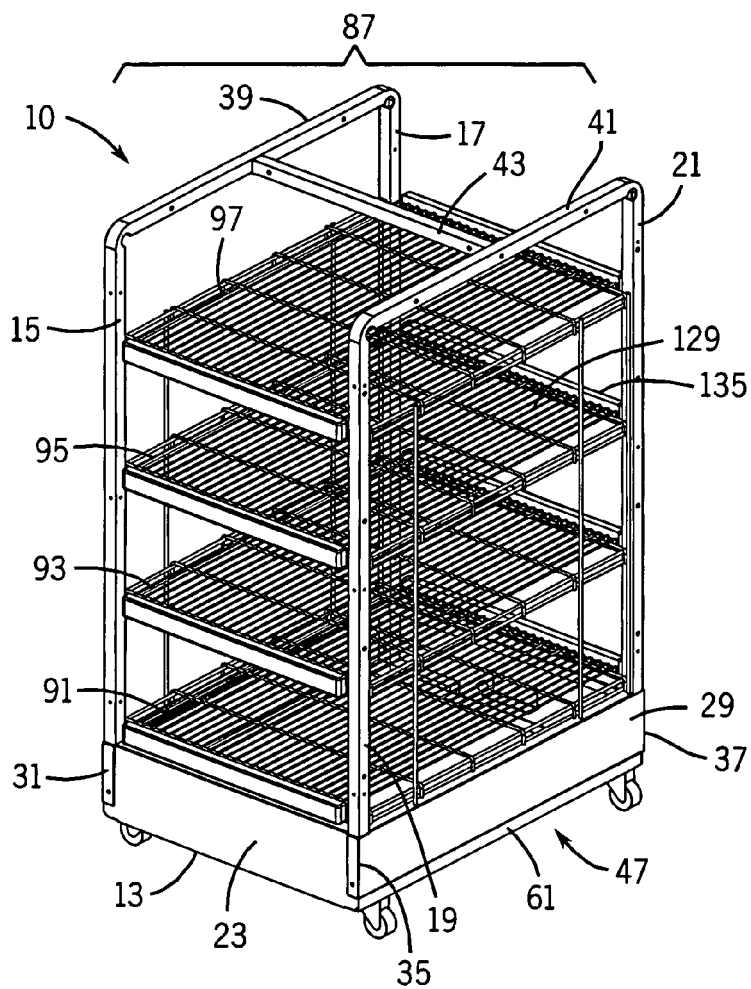
FIG. 4 is a perspective view of the exemplary rack of FIGS. 1-3 but with the wheel supports in a retracted position and auxiliary shelves removed.
Figure 5:
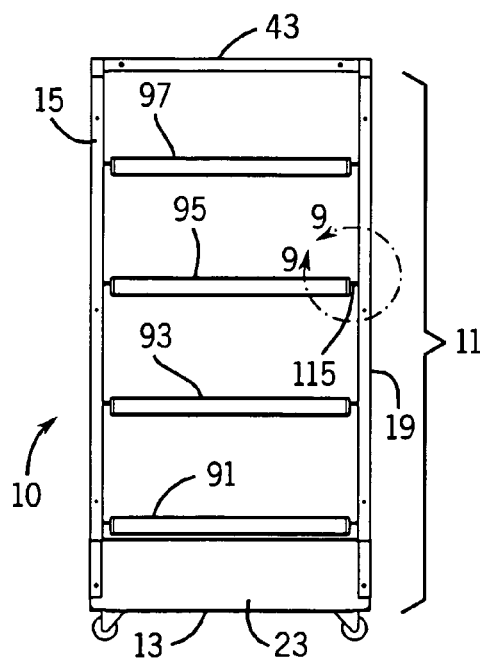
FIG. 5 is a front elevation view of the rack of FIG. 4.
Figure 6:
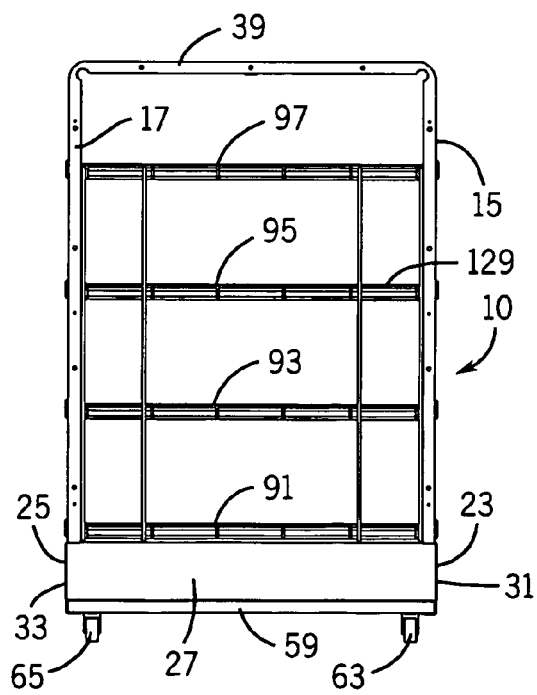
FIG. 6 is a left side elevation view of the rack of FIGS. 4-5.

FIGS. 1-3 show auxiliary shelves 99-113 along the right and left sides of rack 10. In other embodiments, rack 10 may be configured such that auxiliary shelves 99-113 may be mounted along all four sides of rack 10. While first shelf group 87 is shown comprising four shelves 91-97 and second shelf group 89 is shown comprising eight auxiliary shelves 99-113, it should be understood that any number of shelves could be provided consistent with the ability of rack 10 frame 11 to support such shelves.

Shelves 91-97 and 99-113 may include various additional parts. For example, shelves 91-97 may include optional front and rear panels 133, 135 to prevent articles from falling off such shelves. As shown in FIG. 10, shelves 99-113 may include an end panel 137 along shelf outer end 138, a wall 139 along a shelf inner end 140 and end loops 141, 143 for this same purpose. Shelves 91-97 and 99-113 are shown as wire frame shelves but can be of any suitable shelf type.

Operation

Operation of exemplary rack 10 will now be described. A user first determines whether one or more of auxiliary shelves 99-113 are needed for supporting articles and further determines whether the load of articles is such that wheel supports 45, 47 should be extended to stabilize rack 10. Extension of wheel supports 45, 47 is performed as described above by lifting a rack side and by pulling supports 45, 47 outwardly from base until pin 77 drops into opening 81 of stop mechanism 76 limiting further outward sliding movement of wheel supports 45, 47. Each auxiliary shelf 99-113 is mounted on frame 11 by inserting hooks 119, 121 of one or more shelves 99-113 into corresponding openings in uprights 15-21 (e.g. opening 123) as described above.

With auxiliary shelves 99-113 in place and wheel supports 45, 47 extended as desired, rack 10 may be loaded with one or more articles. Loaded rack 10 remains stable and avoids tipping over even when moved because of the improved stability provided by extension of wheel supports 45, 47. Preferred caster wheels 63-69 provide rack 10 with excellent maneuverability.

After use, rack 10 may be compacted for storage simply by removing auxiliary shelves 99-113 and retracting wheel supports 45, 47 as shown in FIGS. 4-6 and 7*a*. Auxiliary shelves 99-113 may be stored in a separate location, such as a closet, until needed again by the user.

While the principles of this invention have been described in connection with specific embodiments, it should be understood clearly that these descriptions are made only by way of example and are not intended to limit the scope of the invention.

I claim:

1. A movable rack comprising:
    a vertically-extending frame;
    extensible wheel supports secured with respect to the frame, each wheel support being movable outward from the frame and having at least one wheel secured thereto;
    a plurality of first shelves secured with respect to the frame; and
    a plurality of second shelves, each second shelf being removably secured with respect to the frame such that, when secured, each second shelf extends outward from the frame.

2. The rack of claim 1 wherein each wheel support comprises:
    a pair of spaced apart wheel support members;
    a wheel mounted to each wheel support member; and
    guide apparatuses secured with respect to the frame and adapted to guide the wheel support members for axial movement between an extended position outward from the frame and a retracted position.

3. The rack of claim 2 wherein each guide apparatus comprises a bottom wall and a pair of side walls defining an axial channel adapted to receive one of the wheel support members for sliding movement therein.

4. The rack of claim 2 further comprising a stop mechanism adapted to hold at least one of the wheel support members in either the extended or retracted position.

5. The rack of claim 4 wherein the stop mechanism comprises:
    a pin extending from a wheel support member; and
    surfaces along the guide apparatus defining a first opening and a second opening spaced outwardly from the first opening, each opening being positioned to receive the pin, whereby, each wheel support member is held in the retracted position by insertion of the pin into the first opening and is held in the extended position by insertion of the pin into the second opening.

6. The rack of claim 1 wherein the wheels are caster wheels.

7. The rack of claim 1 wherein each second shelf is adjacent a first shelf.

8. The rack of claim 1 wherein each second shelf comprises:
   an outer end;
   an inner end; and
   connectors secured with respect to the inner end and adapted to removably secure each second shelf to the frame.

9. The rack of claim 8 wherein:
   the frame defines a plurality of spaced apart openings; and
   the connectors are hooks each adapted to be inserted into a spaced apart opening to removably secure each second shelf to the frame.

10. The rack of claim 9 wherein each first and second shelf comprises a wire-frame shelf.

11. A rack comprising:
    a base;
    extensible wheel supports secured with respect to the base, each wheel support being movable outward from the base and having at least one wheel secured thereto;
    upright pairs secured with respect to the base;
    a plurality of first shelves secured with respect to the upright pairs; and
    a plurality of second shelves, each of said second shelves being removably secured with respect to one of said upright pairs such that, when secured, each second shelf extends outward from one of said upright pairs.

12. The rack of claim 11 wherein each wheel support comprises:
    a pair of spaced apart wheel support members;
    a wheel mounted to the wheel support members; and
    guide apparatuses secured with respect to the base and adapted to guide the wheel support members for axial movement between an extended position outward from the base and a retracted position.

13. The rack of claim 12 wherein each guide apparatus comprises a bottom wall and a pair of side walls defining an axial channel adapted to receive one of the wheel support members for sliding movement therein.

14. The rack of claim 12 further comprising a stop mechanism adapted to hold at least one of the wheel support members in either the extended or retracted position.

15. The rack of claim 14 wherein the stop mechanism comprises:
    a pin extending from a wheel support member; and
    surfaces along the guide apparatus defining a first opening and a second opening spaced outwardly from the first opening, each opening being positioned to receive the pin,
    whereby, each wheel support member is held in the retracted position by insertion of the pin into the first opening and is held in the extended position by insertion of the pin into the second opening.

16. The rack of claim 11 wherein the wheels are caster wheels.

17. The rack of claim 11 wherein the base comprises:
    a first pair of spaced apart sides;
    a second pair of spaced apart base sides joined at generally right angles to the first pair of spaced apart sides; and
    a corner formed at the junction of each first and second spaced apart side.

18. The rack of claim 17 wherein:
    each upright pair comprises a pair of vertical members, each vertical member being disposed proximate a respective corner; and
    each first shelf is secured with respect to each vertical member.

19. The rack of claim 18 wherein each second shelf comprises:
    an outer end;
    an inner end; and
    connectors secured with respect to the inner end and adapted to removably secure each second shelf to a pair of the vertical members.

20. The rack of claim 19 wherein:
    each vertical member has an outer surface defining a plurality of spaced apart openings; and
    the connectors are hooks adapted to be inserted into the spaced apart openings to removably secure the second shelf to the vertical member.

\* \* \* \* \*